(12) United States Patent
Yamagata

(10) Patent No.: US 7,452,729 B2
(45) Date of Patent: Nov. 18, 2008

(54) WASTE HIGH-PRESSURE FLUID PROCESSING METHOD

(75) Inventor: Masahiro Yamagata, Takasago (JP)

(73) Assignee: Kobe Steel, Ltd, Kobe-shi (JP)

( * ) Notice: Subject to any disclaimer, the term of this patent is extended or adjusted under 35 U.S.C. 154(b) by 998 days.

(21) Appl. No.: 10/611,980

(22) Filed: Jul. 3, 2003

(65) Prior Publication Data
US 2004/0005248 A1    Jan. 8, 2004

(30) Foreign Application Priority Data
Jul. 4, 2002 (JP) ............................. 2002-196306

(51) Int. Cl.
G01N 30/00 (2006.01)
(52) U.S. Cl. .................. 436/133; 422/50; 422/101; 422/81; 436/177; 436/181
(58) Field of Classification Search ............ 422/50, 422/101, 81; 436/133, 177, 181
See application file for complete search history.

(56) References Cited

U.S. PATENT DOCUMENTS 3,420,633 A * 1/1969 Lee ........................... 95/177
6,358,673 B1 3/2002 Namatsu
2002/0132192 A1 9/2002 Namatsu

FOREIGN PATENT DOCUMENTS

| EP | 0 992 852 A2 | 4/2000 |
| JP | 3010099 | 2/2000 |
| JP | 2000-223467 | 8/2000 |
| WO | WO 01/78911 A1 | 10/2001 |

* cited by examiner

Primary Examiner—Sam P Siefke
(74) Attorney, Agent, or Firm—Oblon, Spivak, McClelland, Maier & Neustadt, P.C.

(57) ABSTRACT

The present invention relates to a method for processing a waste high-pressure fluid, which is yielded by bringing a high-pressure fluid into contact with a processing object in a high-pressure processing vessel to make unnecessary materials on the processing object accompany it. In accordance with the present invention, a novel processing method is provided which includes the steps of draining liquid ingredients, which is obtained from a preliminarily refined waste medium-pressure fluid, having been decompressed from the waste high-pressure fluid and provided to a separating means filled with packing materials, out of a system with unnecessary materials, and refining gas ingredients, which is also obtained from the preliminarily refined waste medium-pressure fluid, in an adsorbing means including adsorbents.

13 Claims, 4 Drawing Sheets

— CARBON DIOXIDE FLUID AS A REAL GAS
----- CARBON DIOXIDE FLUID AS AN IDEAL GAS
—·— VAPOR PRESSURE CURVE OF CARBON DIOXIDE

WASTE HIGH-PRESSURE FLUID PROCESSING METHOD

BACKGROUND OF THE INVENTION

1. Field of the Invention

The present invention relates to a method for processing a waste high-pressure fluid, which is yielded by bringing a high-pressure fluid into contact with a processing object in a high-pressure processing vessel to make unnecessary materials on the processing object accompany it.

2. Description of the Related Art

Cleaning process is indispensable for eliminating unnecessary resists after pattern forming, or etching polymers left on substrates after etching, in case photoresists are used to form patterns in a semiconductor production process.

Wet cleaning method, which comprises the steps of dipping semiconductor substrates in a stripper (a cleaning solution) to clean them, and subsequently rinsing the stripper out of the substrates with rinsing solutions such as alcohol or extra pure water, have been conventionally adopted as a cleaning method for semiconductors. Known cleaning method, for which organic or inorganic chemical compound have been used as a stripper, suffer from problems in that the stripper may not be infiltrated into the area with reentrants of detailed patterns caused by its surface tension, high viscosity, and so on. Also, it suffer from another problems in that the salient of the patterns may be destroyed caused by capillary force occurring on the interface between gas and liquid, cubical expansion on heating to dry, and so on when drying strippers and/or rinsing solutions. Accordingly, low viscosity high-pressure fluids, for example supercritical carbon dioxide fluid, are examined to be used as strippers or rinsing solutions recently.

In addition, a process for eliminating alcoholic solvents and drying substrates is required in case the substrates are dipped (to rinse) in the alcoholic solvents such as isopropanol (IPA) after developing. Low viscosity high-pressure fluids, for example supercritical carbon dioxide fluid, are proposed to be used for drying process of substrates.

The use of supercritical carbon dioxide fluid as a stripper or a rinsing solution, or the use for drying process of substrates makes the post-processing easy and safe because it vaporizes easily under atmospheric pressure. Moreover, supercritical carbon dioxide fluid can be applied at a low cost because carbon dioxide can be obtained relatively cheaply. Also, it can easily eliminate water, oils and fats etc. stuck on semiconductor substrates because of its high dissolving power and detergency almost equivalent to those of hexane. However, sole use of supercritical carbon dioxide fluid, which can hardly dissolve high polymers such as resists or etching polymers, might result in insufficient detachment and elimination. Accordingly, at least one chemical for improving detergency of supercritical carbon dioxide fluid is added, with at least one auxiliary dissolving agent (entrainer) for improving its affinity for supercritical carbon dioxide fluid. Besides, after cleaning, the surfaces of semiconductor substrates are rinsed by means of supercritical carbon dioxide fluids including auxiliary dissolving agents.

By the way, the high-pressure fluid, having been used for cleaning, rinsing and drying of substrates, which is to be drained as a waste high-pressure fluid out of a system, comprises some unnecessary materials, such as high polymers, chemicals, auxiliary dissolving agents or alcoholic solvents, all of which have been detached and eliminated in the cleaning, rinsing or drying process. Accordingly, the waste high-pressure fluid itself cannot be reused as another high-pressure fluid for cleaning of substrates.

Furthermore, it is desirable to carry out the waste high-pressure fluid processing as well as the cleaning process of substrates in a clean room because semiconductor production processes are also carried out in clean rooms. However, it is desired that the installation area of each processing unit should be as small as possible, moreover that the processing efficiency of each processing unit should be high because not only the construction but also the maintenance and the management of the clean room may costs too much.

SUMMARY OF THE INVENTION

Accordingly, it is an object of the present invention to provide a waste high-pressure fluid processing method for separating and eliminating unnecessary materials efficiently from the waste high-pressure fluid to collect high-purity high-pressure fluid.

The processing method of the present invention relates to a method for processing a waste high-pressure fluid, which is yielded by bringing a high-pressure fluid into contact with a processing object in a high-pressure processing vessel to make unnecessary materials on the processing object accompany it. In accordance with the present invention, a novel processing method is provided which includes the steps of draining liquid ingredients, which is obtained from a preliminarily refined waste medium-pressure fluid, having been decompressed from the waste high-pressure fluid and provided to a separating means filled with packing materials, out of a system with unnecessary materials, and refining gas ingredients, which is also obtained from preliminarily refined waste medium-pressure fluid, in an adsorbing means including adsorbents.

In addition to the steps above, it may be another step of the invention to provide the waste medium-pressure fluid to the separating means once after storing in a reservoir tank provided upstream.

It may still another step of the invention to provide gas ingredients, which are obtained by dividing a part or all of the waste medium-pressure fluid stored in the reservoir tank into gas and liquid ingredients, to the separating means.

It may be a further step of the invention to provide gas ingredients, which are obtained by dividing a part or all of the waste medium-pressure fluid precedently into gas and liquid ingredients, to the separating means.

It may be a still further step of the invention to circulate liquid ingredients, which are obtained by liquefying gas ingredients refined in the adsorbing means, in a liquefying means, back into the separating means after being pressurized.

DETAILED DESCRIPTION OF THE PREFERRED EMBODIMENTS

The present invention which provides a waste high-pressure fluid processing method will now be described in greater detail with reference to the accompanying drawings.

In a cleaning process, chemicals and/or auxiliary dissolving agents are used with a high-pressure fluid, as described above, to strip and eliminate unnecessary materials on a processing object in a high-pressure processing vessel. The auxiliary dissolving agents are used by reason that the combination of the auxiliary dissolving agents with the chemicals makes the chemicals easy to dissolve into the high-pressure fluid resulting in high detergency. Also, a high-pressure fluid including the auxiliary dissolving agents cause remained chemicals behind on the processing object to be eliminated in a rinsing process. A waste high-pressure fluid yielded in a drying process, in which a high-pressure fluid eliminates remained alcoholic solvents away from substrates, includes the alcoholic solvents.

Accordingly, it will be appreciated that the waste high-pressure fluids, being drained out of the high-pressure processing vessel in the cleaning, rinsing and drying processes, include unnecessary materials such as high polymers, chemicals, auxiliary dissolving agents and alcoholic solvents etc., and that they are separated and eliminated from the waste high-pressure fluids which are to circulate through the system to be reused as cleaning medium.

However the overuse of the auxiliary dissolving agents which have high affinity for the high-pressure fluids may causes a great deal of adsorbents to be applied for the elimination of the auxiliary dissolving agents away from the waste high-pressure fluids and/or causes adsorbents to be exchanged frequently with the result that the adsorbing capacity of the adsorbents becomes saturated in a short period of time to lose its removing capacity remarkably.

It is also difficult to eliminate the alcoholic solvents with adsorbents from the waste high-pressure fluids because of its high affinity for the high-pressure fluids. Although it is recently a usual way to dip developed substrates into fluoro-carbon based solvents, there is a similar difficulty eliminating the fluoro-carbon based solvents with adsorbents from the waste high-pressure fluids because of its high affinity for the high-pressure fluids.

Thus, the inventors of the present invention decided to examine these problems. Then, the inventors have completely achieved in solving the problem with the method comprising the steps of draining liquid ingredients, which is obtained from preliminarily refined waste medium-pressure fluid, having been decompressed from the waste high-pressure fluid and provided to a separating means filled with packing materials, out of the system with unnecessary materials, and refining gas ingredients, which is also obtained from the preliminary refined waste medium-pressure fluid, in an adsorbing means including adsorbents.

In addition, the "high-pressure fluid" in the present invention, which may be either in liquid state, in gas state or in mixed state, means a fluid having a gauge pressure of 1 Mpa or more. Any fluid having characteristics such as high density, high cleaning ability, low viscosity, high diffusibility etc. is a preferred high-pressure fluid for the present invention. Any fluid in a subcritical or a supercritical state is more preferable for an example of the "high-pressure fluid" of the present invention, where "fluid in a supercritical state" means a fluid, the pressure of which being its critical pressure or more and the temperature being critical temperature or more, which may be called "supercritical fluid" below.

Carbon dioxide fluid is the most suitable high-pressure fluid from the point of view on safety, price, easiness to get it into a supercritical state etc., while water, ammonia, nitrous suboxide, ethanol etc. may be used.

High-pressure fluids are used in a cleaning, rinsing and/or drying process of the processing object for the reason that it has high diffusion coefficient enough to disperse dissolved unnecessary materials quickly among solvents. The property of the supercritical fluid in a higher temperature and pressure becomes more and more intermediate between gas and liquid resulting in quicker infiltration into the area covered with detailed patterns to show high cleaning ability.

Also, high-pressure fluids having almost the same density as liquid make it possible to include much more chemicals than gas may, for example, the condition with a critical temperature of 31 degrees Celsius or more and a critical pressure of 7.4 Mpa or more is enough for carbon dioxide to become a supercritical fluid.

Carbon dioxide in a subcritical or a supercritical state with the pressure of 5-60 Mpa is a preferred high-pressure fluid in a cleaning and a rinsing process. More preferably, it is desirable to be applied in a supercritical state with the pressure of 7.4-50 Mpa.

Further, the "chemical" of the present invention is added for the purpose of eliminating high polymers such as resists, etching polymers etc. stuck on semiconductor substrates, taking it into account that sole use of a high-pressure fluid such as carbon dioxide etc. might result in insufficient detachment. Basic compound is a preferred ingredient of a chemical, which has high cleaning ability to hydrolyze high polymers used for resists frequently.

As specific examples of the basic compound of the present invention, quarternary ammonium hydroxide, quarternary ammonium fluoride, alkyl amine, alcanorlamin, hidorokish-ilamin ($NH_2OH$) and ammonium fluoride ($NH_4F$) may be used solely as well as in an appropriate combination with each other(s). These ingredients of chemical preferably occupy 0.01-8% by mass of high-pressure fluid. Adding 0.01% or more by mass of high-pressure fluid makes it possible to show its effects fully, while 8% or more makes it difficult to dissolve into the high-pressure fluid, moreover resulting in the dissolution of substrate itself.

An auxiliary dissolving agent for dissolving ingredients of chemical such as basic compound etc. as described above into a high-pressure fluid is required in case the ingredients are not compatible with the fluid, the agent also functioning as it prevents unnecessary materials from reattaching to processing objects in the cleaning or rinsing process. Anything may be an auxiliary dissolving agent as far as it encourages the dissolution or the dispersion of the ingredients of the chemical into high-pressure fluids, for example, aliphatic alcohol, especially, lower aliphatic alcohol with 1-3 carbons such as methanol, ethanol and isopropanol are preferred agents as used solely or in an appropriate combination with each other(s).

The content of the auxiliary dissolving agents may be 2-50% by mass of high-pressure fluid in the cleaning process, for example, while 2-50% in the rinsing process. It will be appreciated thereto that the auxiliary dissolving agents are the materials other than the high-pressure fluid above.

As described above, alcohol based or fluoro-carbon based solvents are utilized for solvents for dipping developed substrates, where isopropanol is given for an example of the alcohol based solvent, while hydrofluoroethers, hydrofluorocarbons, fluorinated alcohols (generally H—$(CF_2)$n-$CH_2OH$), FLUORINERT manufactured by SUMITOMO 3M Limited(trademark), for the fluoro-carbon based ones, as used solely or in an appropriate combination with each other(s).

$C_4F_9OCH_3$ (e.g. "HFE7100" manufactured by SUMITOMO 3M Limited) or $C_4F_9OC_2H_5$ (e.g. "HFE7200" also manufactured by SUMITOMO 3M Limited) is given for an example of the hydrofluoroethers, while $CF_3CHFCHFCF_2CF_3$ ("VERTREL" series, e.g. "VERTREL XF" (trademark) manufactured by du Pont de Nemours and Company) for hydrofluorocarbons. Also, FLUORINERT series above includes "FC-40", "FC-43", "FC-70", "FC-72", "FC-75", "FC-77", "FC-84", "FC-87", "FC-3283", "FC-5312", etc. The fluorinated alcohols above with 2-6 for "n" of the general formula H—$(CF_2)$n-$CH_2OH$ offers the following advantages, that is, preferably, easy to fit in the water left in detailed patterns of substrates resulting in a efficient substitution for the water, moreover, superior in dissolubility into carbon dioxide resulting in that it will hardly be left in the patterns in the drying process.

The processing object is not limited to semiconductor substrates. It may be metals, plastics or ceramics etc., on which different kind of materials may be remained to form continuous or discontinuous layers.

The "waste high-pressure fluid" in the present invention means a fluid, which is yielded by bringing a high-pressure fluid into contact with a processing object in a high-pressure processing vessel to make unnecessary materials on the processing object accompany it. That is, it means any kind of high-pressure fluid, having been drained out of the high-pressure processing vessel, which includes unnecessary materials such as high polymers, chemicals, auxiliary dissolving agents, alcoholic solvents and fluoro-carbon based solvent etc. For the sake of convenience, a processing method will be described below mainly about the waste high-pressure fluid drained out of the high-pressure processing vessel in the "cleaning process". The present invention, however, may be embodied similarly in other specific processes such as in rinsing or drying process for waste high-pressure fluids without departing from the spirit or essential characteristics thereof.

The present invention will be more fully understood from the following description of a waste high-pressure fluid processing method and apparatus when reference is made to the accompanying drawings. However, the configuration shown below may not limited to present invention and may change it based on before and the after-described effect.

Figure 1:
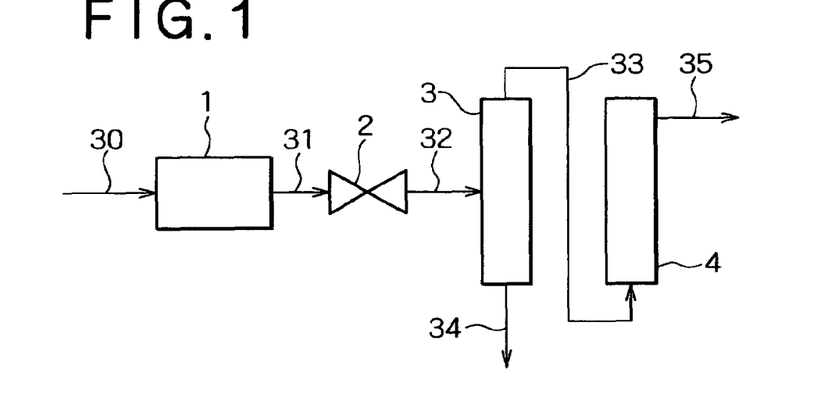
FIG. 1 is one example showing the configuration of an apparatus embodying the waste high-pressure fluid processing method of the present invention.

Referring to the drawing, FIG. 1 illustrates one example showing the configuration of an apparatus embodying the waste high-pressure fluid processing method of the present invention. In FIG. 1, the numerals 1, 2, 3, 4 and 30-35 indicate a high-pressure processing vessel, a decompressing means, a separating tower, an adsorbing tower and paths respectively.

Chemicals and high-pressure fluid including auxiliary dissolving agents are provided to the high-pressure processing vessel 1 through the path 30. The high-pressure fluid, being brought into contact with a processing object in the high-pressure processing vessel 1, strips off unnecessary materials on the processing object and eliminates them. A waste high-pressure fluid, which is accompanied with the unnecessary materials on the processing object, is decompressed after provided to the decompressing means 2 through the path 31, the decompressed fluid will be called as "waste medium-pressure fluid" below.

The "waste medium-pressure fluid" above means a fluid having a lower pressure than that of the waste high-pressure fluid drained out of the high-pressure processing vessel 1, where the decompression ratio depends on the pressure of the waste high-pressure fluid. The pressure of the waste high-pressure fluid get decreased below its critical pressure in case it excesses the critical pressure, while below the pressure thereof in another case that it is 1 MPa or more but less than the critical pressure. In any case, the waste medium-pressure fluid my be decreased below its critical pressure for the reason that the separation and refinement of the waste high-pressure fluid in a mixture state forming gas and liquid makes it possible to separate solvent ingredients and unnecessary materials in the fluid efficiently. However, in the present invention, the whole decompressed waste medium-pressure fluid may be either in liquid phase or gas phase.

Also, the pressure of the waste high-pressure fluid get decreased below the pressure thereof in case it is 1 MPa or more but less than its critical pressure for the reason that the lower the pressure of the waste high-pressure fluid is decompressed, the less the quantity of unnecessary materials dissolving in the fluid decreases, resulting in a high efficiency of the preliminary refinement in the separating tower 3. In this case, the pressure of the waste high-pressure fluid may be decreased by several Mpa.

Although a lower limit of the pressure to make a waste medium-pressure fluid is not specified, it should be set preferably around 3 MPa in order to collect high-purity high-pressure fluid enough to be reused.

A carbon dioxide fluid used as a high-pressure fluid is preferably decompressed into a waste medium-pressure fluid with the pressure of 3-7.4 MPa in case the pressure of the high-pressure fluid is 7.4 MPa or more, the reason for which being explained hereinafter.

The decompressing means 2 in the present invention is not specified. Any means within the public domain, for example, automatic pressure control valves or self-operated pressure control valves may be utilized.

The waste medium-pressure fluid is provided to the separating tower 3 through the path 32. In the present invention, it is important for the separating tower 3 to comprise packing materials which encourage the refinement of the waste medium-pressure fluid in a mixture state forming gas and liquid by the efficient contacts with each other. That is, the contact between gas which going up in the separating tower 3, and liquid which going down, at the surface of the packing materials is encouraged to make the gas more highly-purified, while unnecessary materials is separated accompanying the liquid ingredient to accumulate below the separating tower 3, which may be called "bottom product". Accordingly, the packing materials comprised in the separating tower 3 make it possible to separate and collect unnecessary materials a liquid ingredient.

In the case no packing materials are comprised in the separating tower 3, the liquid ingredient out of the waste medium-pressure fluid provided to the separating tower 3 accumulates below the tower 3, discouraging the contact between gas and liquid causing most of the unnecessary materials to be extracted as gas ingredients. In particular, auxiliary dissolving agents, alcoholic solvents and fluorocarbon based solvents etc. described above are easy to be extracted as gas ingredients from the separating tower 3 because of its high affinity for high-pressure fluid. As a result, small quantity of unnecessary materials, especially materials having high affinity for high-pressure fluid, accumulates at the bottom of the tower 3 as liquid ingredients.

It is recommended that the bottom product at the bottom of the separating tower 3 should be heated appropriately there before extracting out of the system through the path 34, hoping for the gasification of a part of the high-pressure fluid in the liquid ingredients. The heating temperature is not specified as far as it is enough to extract the high-pressure fluid from the separating tower 3 as gas ingredients, while attention should be given to an excessive heating which may causes the gasification of the materials other than high-pressure fluid (solvent).

It is also preferable that a refluxing means (e.g., a condenser) for condensing a part of the gas ingredient, which is to be circulated back into the separating tower 3 as a refluxing liquid, extracted wherefrom is arranged on the top of the tower 3. The refluxing liquid, actively contacting with gas ingredients which go up in the separating tower 3, make extracted gas ingredients from the tower 3 more highly-purified.

The position to provide the waste medium-pressure fluid into the separating tower 3 is not specified, however, any position below the middle of the up-and-down direction of the range filled with packing materials in the tower 3 is preferable for the reason that the gas ingredients out of the waste medium-pressure fluid contact, during its going up through the packing materials, efficiently with the refluxing liquid flowing down through the packing materials to restrain the adulteration amount of the auxiliary dissolving agents in the gas phase as small as possible.

Further, it is desirable to provide the waste medium-pressure fluid from the lower part of the separating tower 3, all the gas ingredients out of the fluid contacting with the refluxing liquid in the packing materials without fail to make extracted gas ingredients from the tower 3 more highly-purified. In addition, the separating tower 3 in the foregoing description may be short in height enough to be installed preferably in such a place having height limitation as a clean room.

The type of the packing materials used for the present invention is not specified. Anything within the public domain may be utilized, for example, trays used for plate tower type distillators (e.g., perforated plate trays and valve trays etc.), irregular packing materials (e.g., raschig rings, pole rings, lessing rings, berl saddles, interlocks saddle and tellerette etc.) and structured packing materials, which can more preferably be used because of its large contact area per unit capacity.

The packing materials with the specific surface area per unit volume of 200-500 $m^2/m^3$ are preferably used for distillation operating under a high-pressure, especially in such a place having height limitation as a clean room, the reason for which being explained hereinafter.

The preliminary refined gas ingredients in the separating tower 3 is provided through the path 33 to the adsorbing tower 4, where adsorbents are provided to adsorb and eliminate very small amount of unnecessary materials mixed in the gas ingredients above. That is, chemicals and high polymers are eliminated as liquid ingredients in the separating tower 3, while other materials having high affinity for the materials of high-pressure fluid, such as auxiliary dissolving agents, alcoholic solvents and fluoro-carbon based solvents etc. may not be separated completely, a part of the materials being provided to the adsorbing tower 4 being mixed in gaseous medium-pressure fluid.

Accordingly, the type of the adsorbents filled in the adsorbing tower 4 is not specified as far as it can adsorb and eliminate such materials as auxiliary dissolving agents, alcoholic solvents and fluoro-carbon based solvents etc. Activated carbons and synthetic zeolites etc., for example, are utilized as adsorbents for the adsorption of aliphatic series alcohols such as methanol and ethanol etc., while activated aluminas, synthetic zeolites and silicagels etc. for water. It will be appreciated that adsorbents should be something that may adsorb and eliminate the materials other than high-pressure fluid.

It may also be a preferred embodiment to fill with a plurality of different type adsorbents into one adsorbing tower, raising the cleanliness of gas ingredients, while a plurality of different type adsorbents may also be filled into a plurality of adsorbing towers respectively.

Figure 2:
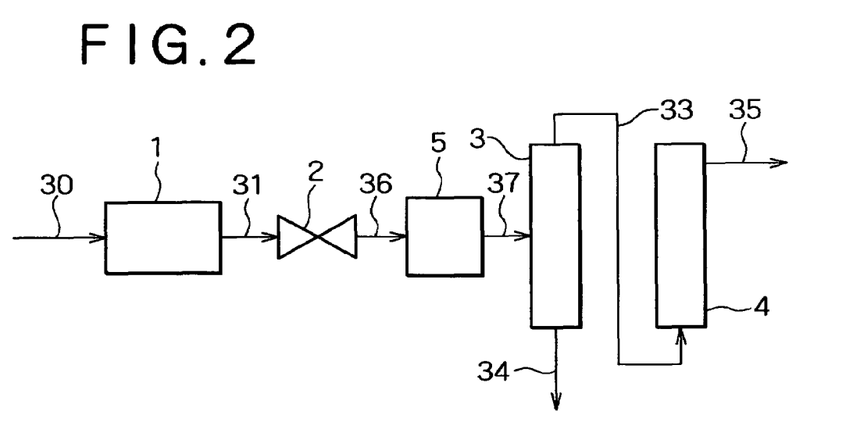
FIG. 2 is another example showing the configuration of an apparatus embodying the waste high-pressure fluid processing method of the present invention.

FIG. 2 illustrates another example showing the configuration of an apparatus embodying the waste high-pressure fluid processing method of the present invention, having same numerals for the same part referring to FIG. 1 above. In FIG. 2, the numerals 5 and 36-37 indicate a reservoir tank and paths respectively.

The quantity of unnecessary materials included in the waste high-pressure fluid drained out of the high-pressure processing vessel 1 after processing, which is generally carried out in a batch mode, depends on each processing step. Also, the quantity of unnecessary materials included in the waste high-pressure fluid drained out of each processing vessel after each processing step fluctuates considerably. Accordingly, the quantity of each ingredient included in the waste high-pressure fluid should preferably be fixed to some extent to carry out the distillation operating efficiently in the separating tower 3.

In FIG. 2, between the decompressing means 2 and the separating tower 3 is arranged the reservoir tank 5 for storing the waste medium-pressure fluid to have the quantity of each ingredient included in the fluid fixed to some extent. The stored waste high-pressure fluid may be provided to the separating tower 3 appropriately. The reason the reservoir tank 5 provided downstream the decompressing means 2 is that the pressure in the tank 5 can be lower than that before decompressing.

It may be a preferred embodiment that the reservoir tank 5 is provided between the high-pressure processing vessel 1 and the decompressing means 2 to store the waste high-pressure fluid drained out of the vessel 1 once into the tank 5 to make the quantity of the ingredients included, to be provided to the means 2 later, fixed to some extent, which differs from the embodiment in FIG. 2, where the reservoir tank 5 is provided between the decompressing means 2 and the separating tower 3.

Figure 3:
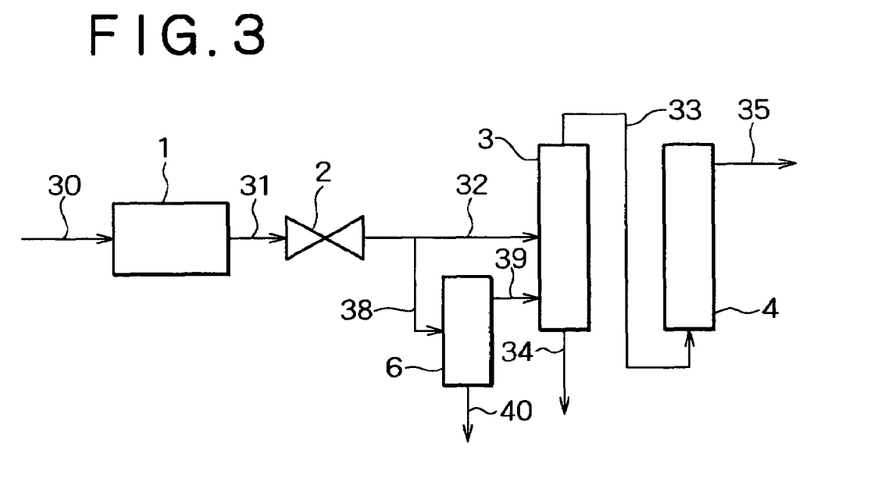
FIG. 3 is still another example showing the configuration of an apparatus embodying the waste high-pressure fluid processing method of the present invention.

FIG. 3 illustrates still another example showing the configuration of an apparatus embodying the waste high-pressure fluid processing method of the present invention. In FIG. 3, a gas-liquid separating tank 6 is added to the configuration of FIG. 1 above, and the numerals 38-40 indicate paths.

The decompression of the high-pressure fluid accompanied with unnecessary materials, for example high polymers such as resists or etching polymers, on the processing object may causes the solubility of the high polymers to be dropped, and the polymers to be precipitated as solids, resulting in the confinement in the packing material layers when the decompressed waste high-pressure fluid is provided to the separating tower.

The gas-liquid separating tank 6 is, therefore, provided downstream the decompressing means 2, to divide a part or all of the waste medium-pressure fluid of the separating tower 3, which is provided through the path 38, into gas and liquid ingredients precedently, and to return the gas ingredients back to the tower 3 through the path 39, resulting in any reduction or prevention of the confinement in the packing material layers, at which time the separated gas ingredients should preferably be provided from the lower part of the tower 3 for the purpose of the reduction of the liquid load in the tower caused by the contact between the gas ingredients and the liquid ingredients of the waste medium-pressure fluid provided directly to the tower 3 from the decompressing means 2.

In contrast, it is not required to provide the separated gas ingredients from the lower part of the separating tower 3 in case all of the waste medium-pressure fluid is divided into gas and liquid ingredients precedently in the gas-liquid separating tank 6. It may be provided from the middle or the upper part of the up-and-down direction of the tower 3, as described above, at which time the gas ingredients separated including no high polymers in the tank 6 causes no confinement in the packing material layers.

The collected liquid ingredients in the gas-liquid separating tank 6 will be refined to be recycled in another refining means by eliminating chemicals and/or auxiliary dissolving agents after being drained out of the system through the path 40.

Figure 4:
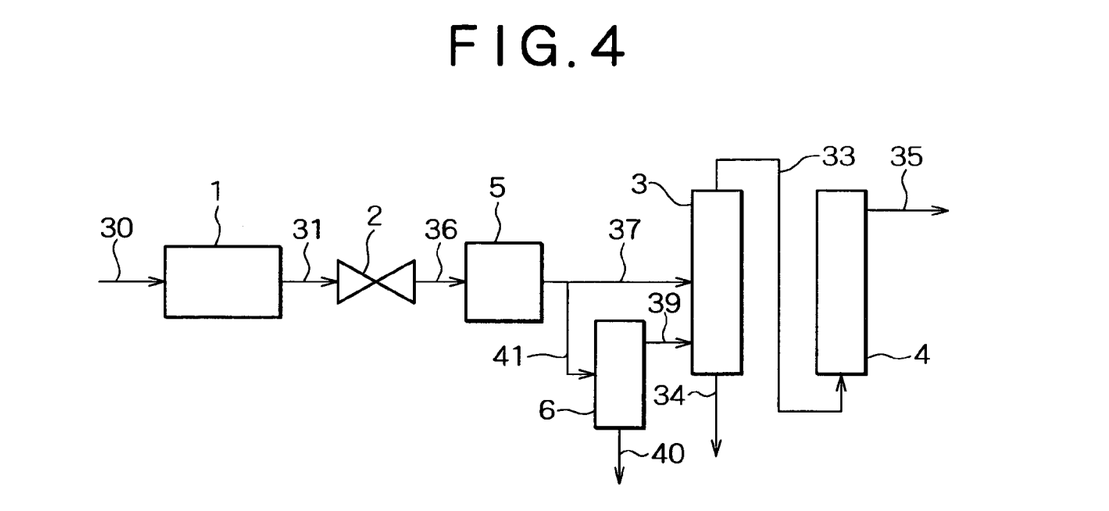
FIG. 4 is a further example showing the configuration of an apparatus embodying the waste high-pressure fluid processing method of the present invention.

FIG. 4 illustrates a further example showing the configuration of an apparatus embodying the waste high-pressure fluid processing method of the present invention. In FIG. 4, a reservoir tank 5 and a gas-liquid separating tank 6 are added to the configuration of FIG. 1 above.

In this figure, the waste medium-pressure fluid is stored in the reservoir tank 5 to have the concentration of the ingredients included in the fluid fixed, and a part or all of the stored waste medium-pressure fluid of the tank 5, which is provided to the gas-liquid separating tank 6 through the path 41, is divided into gas and liquid ingredients precedently, the separated gas ingredients being circulated back into the tower 3.

It may be a preferred embodiment that the reservoir tank 5 is provided upstream the decompressing means 2 to decrease the pressure of the waste high-pressure fluid drained out of the vessel 1 after storing the fluid once into the tank 5, which differs from the embodiment in FIG. 4, where the reservoir tank 5 is provided between the decompressing means 2 and the separating tower 3. Also, the gas-liquid separating tank 6 may be high-capacity enough to be integrated with the reservoir tank 5.

Figure 5:
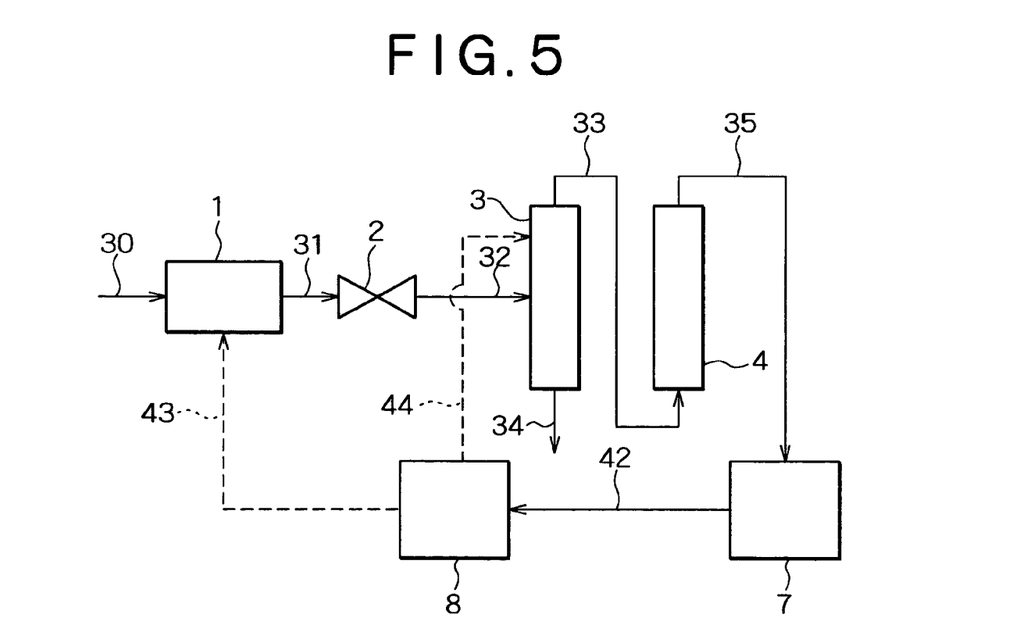
FIG. 5 is a still further example showing the configuration of an apparatus embodying the waste high-pressure fluid processing method of the present invention.

FIG. 5 illustrates a still further example showing the configuration of an apparatus embodying the waste high-pressure fluid processing method of the present invention. In FIG. 5, a liquefying means 7 and a pressurizing means 8 are added to the configuration of FIG. 1 above, and the numerals 42-44 indicate paths.

The gas ingredients of the present invention hardly include unnecessary materials, drained out of the adsorbing tower 4, in which adsorbents being arranged, after refining the preliminary refined gas ingredients in the separating tower 3, in which packing materials being arranged. Accordingly, the gas ingredients drained out of the adsorbing tower 4 may be reused when the gas return to the high-pressure processing vessel 1 through the path 43 after liquefied in the liquefying means 7 and pressurized in the pressurizing means 8.

Further, the liquid ingredients of the present invention pressurized in the pressurizing means 8 above, being circulated back into the upper part of the separating tower 3 as a reflux, may require no refluxing means, which is generally arranged on the top of the tower 3.

In addition, the liquid ingredients pressurized in the pressurizing means 8 may be circulated back into both the high-pressure processing vessel 1 and the separating tower 3. However, it will be appreciated that the pressure of the liquid ingredients are required to be adjusted appropriately in case the pressure in the vessel 1 differs from that in the tower 3.

It is secondary important to determine operating conditions in consideration of the equilibrium at a high pressure to divide the fluid in the separating tower into gas and liquid ingredient for the reason that highly pressurized gas ingredients do not behave like an idea gas generally. The pressure of carbon dioxide fluid, being used as a high-pressure fluid, should preferably be adjusted 7.4 MPa or more to make consequently the pressure of the waste high-pressure fluid, accompanied with unnecessary materials on the processing object, 7.4 MPa or more, and to make the pressure of the waste medium-pressure fluid, that is the decompressed waste high-pressure fluid, 3 MPa or more but less than 7.4 MPa, the reason for which being explained hereinafter.

Figure 6:
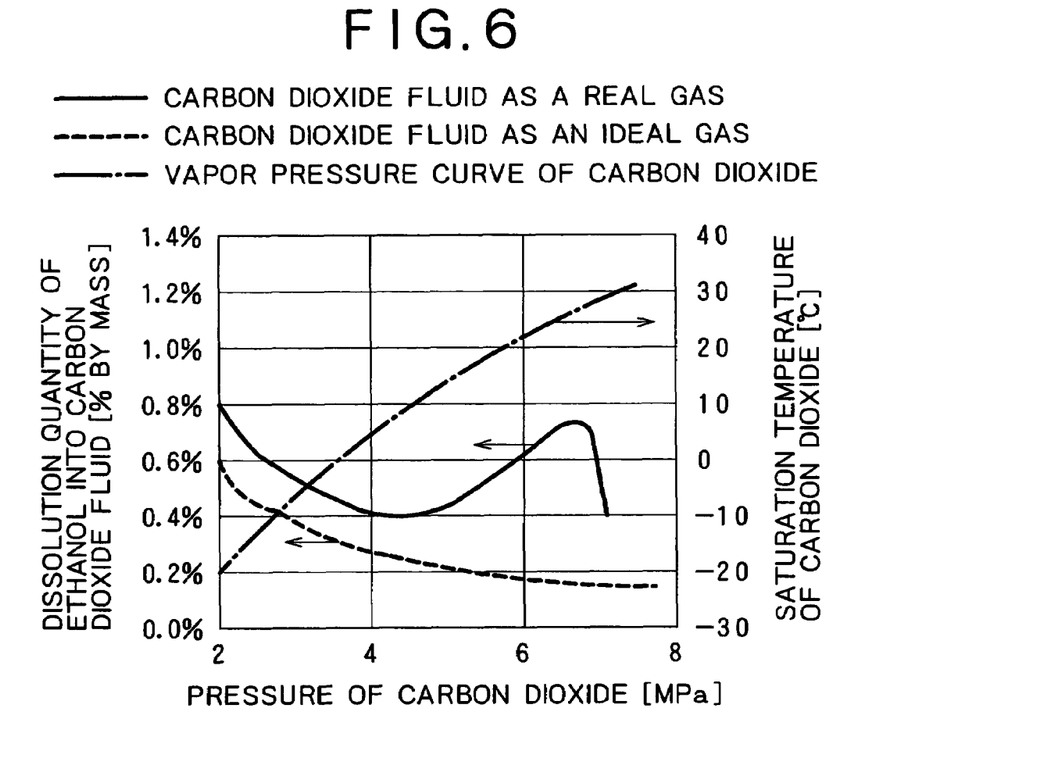
FIG. 6 is a graph plotting dissolution quantity of ethanol into carbon dioxide fluid or saturation temperature of carbon dioxide against the pressure of carbon dioxide fluid.

FIG. 6 illustrates a graph plotting dissolution quantity of ethanol into carbon dioxide fluid or saturation temperature of carbon dioxide against the pressure of carbon dioxide fluid, where the temperature of carbon dioxide fluid is 32 degrees Celsius when ethanol is dissolved in the carbon dioxide fluid.

As illustrated in FIG. 6, Ethanol dissolves into carbon dioxide fluid utilize as a high-pressure fluid, that is, the dissolution quantity of ethanol into carbon dioxide fluid is reduced as the pressure of the fluid rises when both carbon dioxide and ethanol may be considered as ideal gases according to Dalton's Law, as the dotted line in the figure indicates. In fact, however, the dissolution quantity of ethanol into carbon dioxide fluid is reduced as the pressure of the fluid rises in the range of about 2-4 MPa, while the dissolution quantity is increased as the pressure rises in the range of about 4-7 MPa, for the reason that the affinity between carbon dioxide fluid and ethanol is considered to be strengthen when the pressure becomes greater than 4 MPa. In addition, the reason for the rapid reduction of the concentration of ethanol around 7 MPa is thought that it is also near the critical point of carbon dioxide.

The gas ingredients extracted from the upper part of the separating tower are highly pure enough to have almost the same saturation temperature as that indicated by the vapor pressure curve of pure carbon dioxide because of its purity being high, for example, the vapor pressure curve of carbon dioxide fluid is illustrated as the dashed line in FIG. 6. Accordingly, it is desirable to get operating temperature close to the room temperature in consideration of the heat loss or heat invasion in the separating tower or the adsorbing tower.

From these points of view, the refining efficiency of carbon dioxide can be improved and the heat loss can be reduced by adjusting the pressure of the waste medium-pressure fluid, which being provided to the separating tower, between 3 and 7.4 MPa, preferably 4 and 6 MPa.

By the way, additional high-pressure fluids should be appropriately replenished for the cyclic use of the fluid in the system of the present invention, which decreases gradually as the continuous operating. For the replenishment, low-purity fluids can be utilized without any problem in the present invention, for example, in a high-pressure processing of semiconductor wafers. The high-pressure processing vessel should be opened up under atmospheric pressure when putting wafers in and out, at which time the gas ingredients in the high-pressure processing vessel are released into atmosphere. Accordingly, the safe quantity of high-pressure fluid materials as that released into atmosphere is required to be replenished in the system, at which time high-purity high-pressure fluid is required especially for the high-pressure processing of semiconductor wafers etc. However, high-purity fluids are generally expensive, which may causes operating cost to be increased. When it comes to carbon dioxide, high-purity gases with the purity of 99.999% are found on the market, however, it conventionally does not have a record of high capacity transportation by tankers etc. Then, it should be supplied for the high-pressure processing vessel with volume-restricted cylinders as a necessity. As a result, airs and/or waters may be get mixed in the system when changing the cylinders, which causes the purity of the high-pressure fluid in the system to be fallen.

Although inexpensive low-purity carbon dioxide gases are put on the market for general or food use, the former having the purity of about 99.9% at best, while the latter about 99.98%, both of them include some impurities such as water, light hydrocarbon, oxygen and sulfur etc. Accordingly, there are some problems with the utilization of these inexpensive carbon dioxide gases for the processing of semiconductor wafers.

By virtue of the features of the present invention as described, however, low-purity carbon dioxide gases can be utilized for the processing of semiconductor wafers without any problem, as hydrocarbons included in the low-purity carbon dioxide gases used for replenishment being eliminated in the separating tower, while sulfurs and waters being eliminated in the adsorbing tower.

The present invention will be described in further details with the first and second embodiment. The present invention, however, may be embodied in other specific forms than described below without departing from the spirit or essential characteristics thereof.

Referring to Table 1, an example of the present invention, that is, the first embodiment will be explained firstly. In this embodiment, a waste high-pressure fluid utilized for cleaning of semiconductor wafers in a high-pressure processing vessel was processed in the waste high-pressure fluid processing apparatus illustrated in FIG. 7.

Figure 7:
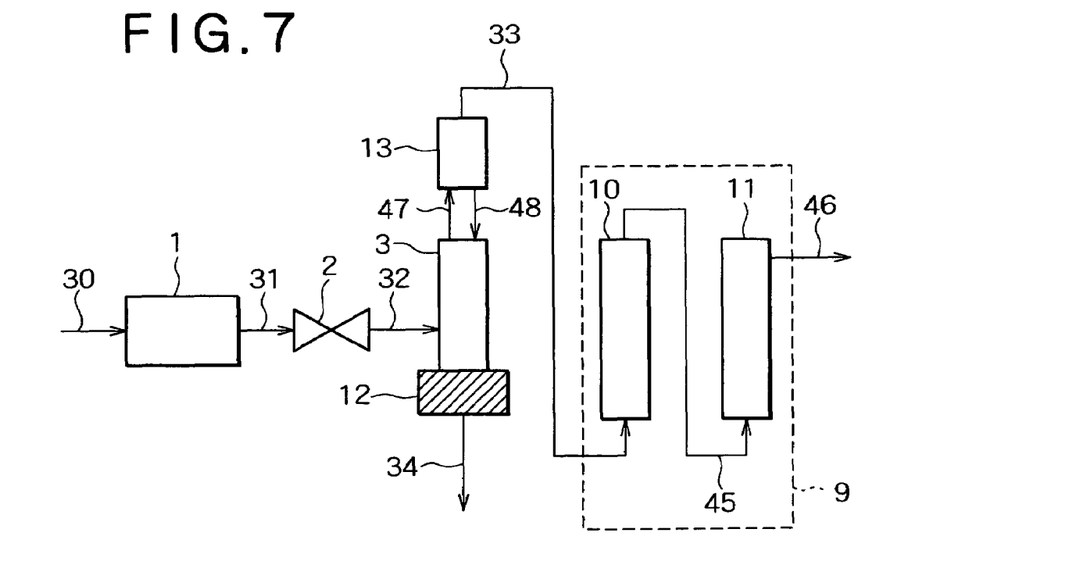
FIG. 7 is another example showing the configuration of an apparatus embodying the waste high-pressure fluid processing method of the present invention.

FIG. 7 illustrates the configuration of the waste high-pressure fluid processing apparatus used for the first embodiment. In FIG. 7, the numerals 1, 2, 3 and 9 indicate a high-pressure processing vessel, a decompressing means, a separating tower and an adsorbing means respectively, the adsorbing means 9 consisting of two adsorbing tower 10 and 11. The separating tower 3 includes structured packing materials with the specific surface area per unit volume of 350 $m^{2/m3}$. The adsorbing means 9, consisting of two adsorbing tower 10 and 11, is equivalent to the adsorbing tower 4 in FIG. 1 above. The adsorbing towers 10 and 11 include activated carbons and synthetic zeolites respectively.

Semiconductor wafers are cleaned in the high-pressure processing vessel 1 by providing supercritical fluid, the composition of which being indicated in Table 1, to the vessel 1 through the path 30, where the supercritical fluid is carbon dioxide fluid including ethanol and water, and ammonium fluoride as auxiliary dissolving agents and a chemical respectively. The temperature in the high-pressure processing vessel is 60 degrees Celsius, and the pressure 15 MPa.

TABLE 1

| | Composition (% by mass) | | | | |
|---|---|---|---|---|---|
| Measuring object | Carbon dioxide | Ethanol | Water | Ammonium fluoride | |
| Supercritical fluid provided to the high-pressure processing vessel | 89.4 | 10.0 | 0.58 | 0.02 | |
| Gas ingredient extracted from the top of the first separating tank | 99.97 | 0.02 | 0.01 | 0 | Examples of the present invention |
| Liquid ingredient extracted from the bottom of the first separating tank | 20.1 | 75.4 | 4.3 | 0.2 | |
| Gas ingredient extracted from the second separating means | 99.999 | | | 0.001 | |
| Gas ingredient extracted from the top of the first separating tank | 99.43 | 0.52 | 0.05 | 0 | Comparative examples |
| Liquid ingredient extracted from the bottom of the first separating tank | 42.89 | 53.93 | 3.07 | 0.11 | |

A waste medium-pressure fluid is given by decompressing the waste high-pressure fluid utilized for the cleaning of the semiconductor wafers below 6 MPa with the decompressing means 2, at the temperature of 33 degrees Celsius. The waste high-pressure fluid consists of liquid phase and gas phase, the liquid phase including unnecessary materials, ethanol, water and ammonium fluoride, while the gas phase mostly carbon dioxide with very small quantity of ethanol and water, where an automatic pressure control valve is utilized as the decompressing means 2.

The waste medium-pressure fluid is provided to the separating tower 3 through the path 32, which having been provided from the lower part of the up-and-down direction of the packing materials included in the tower 3. The waste medium-pressure fluid is divided into liquid phase and gas phase, and the liquid phase accumulates at the bottom of the separating tower 3, while the gas phase is extracted out of the system from the top of the tower 3.

The heating means 12 is installed at the bottom of the separating tower 3 to vaporize carbon dioxide included in the liquid phase by heating the bottom product until 100 degrees Celsius. The liquid left at the bottom is drained out of the tower 3 through the path 34.

In contrast, a part of the gas ingredients extracted from the top of the separating tower 3 is return back to the tower 3 as a reflux through the path 48 after being send to the condenser 13 through the path 47 to be cooled off. The purity of the gas ingredients (carbon dioxide) extracted from the top of the separating tower 3 is improved by getting circulated reflux to flow down in the separating tower 3 to encourage the contact between gas and liquid ingredients. From the top of the separating tower 3, a part of the gas ingredients is provided to the adsorbing means 9 through the path 33. The composition of the gas ingredients extracted from the top of the tower 3 and the liquid ingredients extracted from the bottom of the tower 3 is also indicated in Table 1 above.

In the adsorbing tower 10, in which activated carbons are filled as adsorbents, ethanol is mainly adsorbed to be eliminated from the waste medium-pressure fluid. The waste medium-pressure fluid is provided to the adsorbing tower 11 through the path 45, in which synthetic zeolites are filled to adsorb water mainly in the fluid to eliminate.

The expression "mainly" in the foregoing description is used for the reason that the synthetic zeolites in the adsorbing tower 11 adsorb ethanol in case the activated carbons in the adsorbing tower 10 have adsorbed very small quantity of water, or ethanol still remain in the gas ingredients provided to the tower 11 through the path 45.

The composition of the gas ingredients extracted out of the system through the path 46 is indicated in Table 1 above, which ethanol and water having been adsorbed and eliminated in the adsorbing means 9. As evidenced by Table 1, high-purity carbon dioxide gas can be collected from the waste high-pressure fluid of the present invention. Accordingly, the waste high-pressure fluid of the present invention can be reused in the high-pressure processing vessel and/or the separating tower after pressurizing liquefied carbon dioxide in the liquefying means arranged downstream the adsorbing means 9 as illustrated in FIG. 5.

In addition, a comparative example, which is operated in the same conditions as the example of the present invention described above except that the packing materials are not included in the separating tower 3 in FIG. 7, is indicated in Table 1 in conjunction with the example of the present invention (the first embodiment). As a result, the low efficiency of the preliminary refinement by the contact between gas and liquid ingredients causes a lot of ethanol to be included in the gas ingredients extracted from the top of the tower as indicated in Table 1. Accordingly, the gas ingredients extracted from the adsorbing means 9, having broken through the means including the same quantity of adsorbents in a short time, also include a lot of ethanol, and require further processing to reuse them.

The explanation about the second embodiment will be followed hereinafter.

Figure 8:
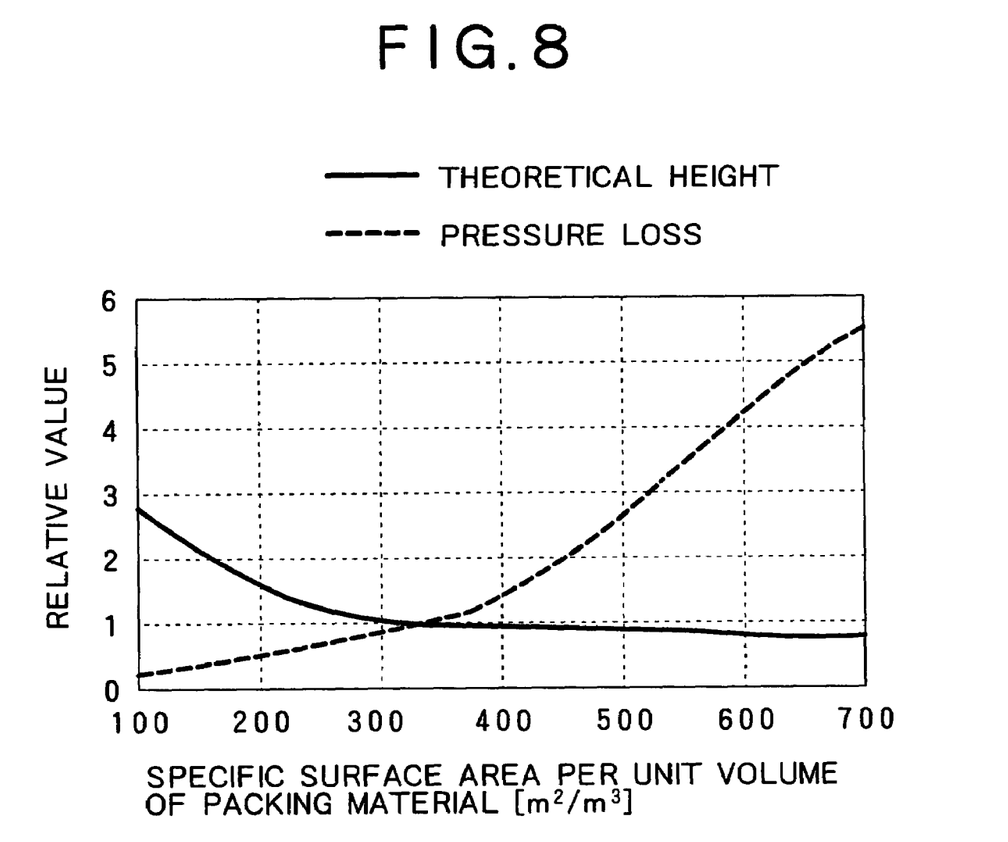
FIG. 8 is a graph showing a relationship between specific surface area per unit volume of packing materials and theoretical height or pressure loss of the packing materials.

FIG. 8 illustrates the relationship between specific surface area per unit volume of packing materials and theoretical height or pressure loss of the packing materials for various packing materials included in the separating tower when operating in the same conditions as the first embodiment by utilizing the waste high-pressure fluid processing apparatus illustrated in FIG. 7. In FIG. 8, X axis represents specific surface area per unit volume of packing materials, while Y axis represents relative value compared to the value with the specific surface area per unit volume of 350 $m^2/m^3$.

As evidenced by FIG. 8, pressure loss by packing materials is found to be kept low, while theoretical height is increased, in case specific surface area per unit volume of the packing materials is less than 200 $m^2/m^3$. In contrast, theoretical height is found to be kept low, while pressure loss is increased, in case specific surface area per unit volume of the packing materials is 500 $m^2/m^3$ or more. The packing materials, therefore, with the specific surface area per unit volume of 200-500 $m^2/m^3$ are preferably used, and more preferably 300-400 $m^2/m^3$ for distillation operating under a high-pressure, especially in such a place having height limitation as a clean room.

What is claimed is:

1. A waste high-pressure fluid processing method, comprising the steps of:
   bringing a high-pressure fluid into contact with a processing object in a high-pressure processing vessel;
   decompressing said waste high-pressure fluid accompanied with unnecessary materials on said processing object into a waste medium-pressure fluid;
   refining preliminarily said waste medium-pressure fluid which is provided to a separating means including packing materials; and
   dealing with ingredients obtained through the preliminary refinement, comprising the steps of;
   draining liquid ingredients with said unnecessary materials out of a system, and
   refining gas ingredients by an adsorbing means including adsorbents,
   further comprising the additional step of providing said waste medium-pressure fluid to said separating means once after storing in a reservoir tank provided upstream said separating means.

2. The waste high-pressure fluid processing method according to claim 1, comprising the additional step of providing gas ingredients, which are obtained by dividing a part or all of said waste medium-pressure fluid stored in said reservoir tank into gas and liquid ingredients, to said separating means.

3. A waste high-pressure fluid processing method, comprising the steps of:
   bringing a high-pressure fluid into contact with a processing object in a high-pressure processing vessel;
   decompressing said waste high-pressure fluid accompanied with unnecessary materials on said processing object into a waste medium-pressure fluid;
   refining preliminarily said waste medium-pressure fluid which is provided to a separating means including packing materials; and
   dealing with ingredients obtained through the preliminary refinement, comprising the steps of;
   draining liquid ingredients with said unnecessary materials out of a system, and
   refining gas ingredients by an adsorbing means including adsorbents,
   further comprising the additional step of providing gas ingredients, which are obtained by dividing a part or all of said waste medium-pressure fluid precedently into gas and liquid ingredients, to said separating means.

4. A waste high-pressure fluid processing method comprising the steps of:
   bringing a high-pressure fluid into contact with a processing object in a high-pressure processing vessel;
   decompressing said waste high-pressure fluid accompanied with unnecessary materials on said processing object into a waste medium-pressure fluid;
   refining preliminarily said waste medium-pressure fluid which is provided to a separating means including packing materials; and
   dealing with ingredients obtained through the preliminary refinement, comprising the steps of;

draining liquid ingredients with said unnecessary materials out of a system, and refining gas ingredients by an adsorbing means including adsorbents, further comprising the additional step of circulating liquid ingredients, which are obtained by liquefying gas ingredients refined in said adsorbing means, in a liquefying means, back into the separating means after being pressurized.

5. A waste high-pressure fluid processing method, comprising the steps of:

bringing a high-pressure fluid into contact with a processing object in a high-pressure processing vessel;

decompressing said waste high-pressure fluid accompanied with unnecessary materials on said processing object into a waste medium-pressure fluid;

refining preliminarily said waste medium-pressure fluid which is provided to a separating means including packing materials; and dealing with ingredients obtained through the preliminary refinement, comprising the steps of;

draining liquid ingredients with said unnecessary materials out of a system, and refining gas ingredients by an adsorbing means including adsorbents, wherein said waste high-pressure fluid get decompressed into said waste medium-pressure fluid, according to the cases of;

the pressure of said waste high-pressure fluid being its critical pressure or more, below the critical pressure; and the pressure of said waste high-pressure fluid being 1 MPa or more but less than the critical pressure, below the pressure thereof.

6. The waste high-pressure fluid processing method according to claim 1, wherein said high-pressure fluid is carbon dioxide.

7. A waste high-pressure fluid processing method, comprising the steps of:

bringing a high-pressure fluid into contact with a processing object in a high-pressure processing vessel;

decompressing said waste high-pressure fluid accompanied with unnecessary materials on said processing object into a waste medium-pressure fluid;

refining preliminarily said waste medium-pressure fluid which is provided to a separating means including packing materials; and dealing with ingredients obtained through the preliminary refinement, comprising the steps of;

draining liquid ingredients with said unnecessary materials out of a system, and refining gas ingredients by an adsorbing means including adsorbents, wherein said high-pressure fluid is carbon dioxide, the pressure of said waste high-pressure fluid being 7.4 MPa or more, and the pressure of said waste medium-pressure fluid being 3 MPa or more but less than 7.4 MPa.

8. A waste high-pressure fluid processing method, comprising the steps of:

bringing a high-pressure fluid into contact with a processing object in a high-pressure processing vessel;

decompressing said waste high-pressure fluid accompanied with unnecessary materials on said processing object into a waste medium-pressure fluid;

refining preliminarily said waste medium-pressure fluid which is provided to a separating means including packing materials; and dealing with ingredients obtained through the preliminary refinement, comprising the steps of;

draining liquid ingredients with said unnecessary materials out of a system, and refining gas ingredients by an adsorbing means including adsorbents, wherein said packing materials have a specific surface area per unit volume of 200 -500 $m^2/m^3$.

9. The waste high-pressure fluid processing method according to claim 3, wherein said high-pressure fluid is carbon dioxide.

10. The waste high-pressure fluid processing method according to claim 4, wherein said high-pressure fluid is carbon dioxide.

11. The waste high-pressure fluid processing method according to claim 5, wherein said high-pressure fluid is carbon dioxide.

12. The waste high-pressure fluid processing method according to claim 7, wherein said high-pressure fluid is carbon dioxide.

13. The waste high-pressure fluid processing method according to claim 8, wherein said high-pressure fluid is carbon dioxide.

* * * * *